March 17, 1964  H. P. DENGLER  3,125,504
HYDROFINING PROCESS
Filed April 13, 1959
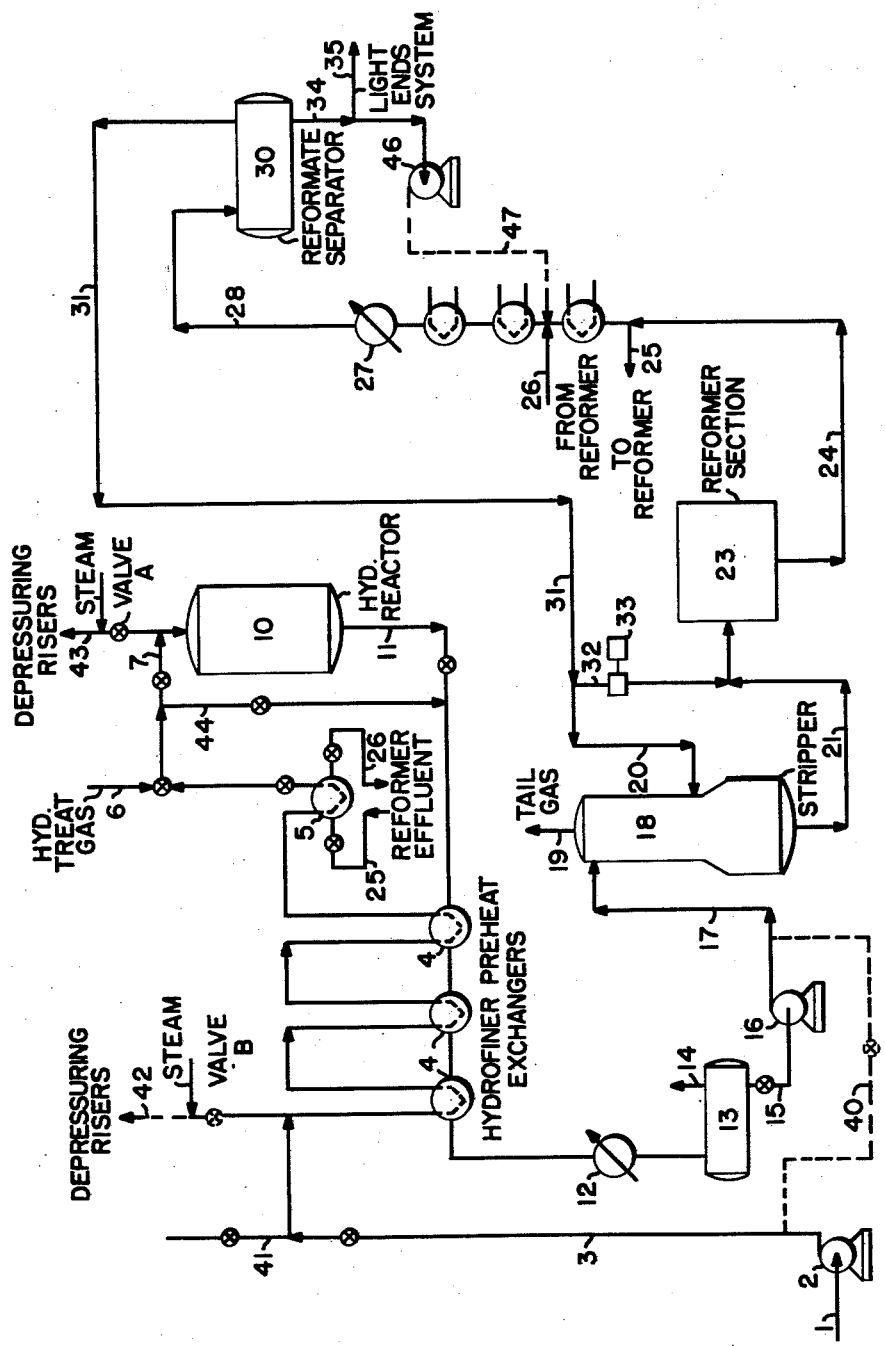
Herbert P. Dengler  Inventor
By  H. N. Freyer  Patent Attorney

United States Patent Office 3,125,504
Patented Mar. 17, 1964

3,125,504
HYDROFINING PROCESS
Herbert P. Dengler, Fair Haven, N.J., assignor to Esso Research and Engineering Company, a corporation of Delaware
Filed Apr. 13, 1959, Ser. No. 805,972
3 Claims. (Cl. 208—89)

This invention relates to the hydrofining of hydrocarbon fractions. More particularly, this invention pertains to a method for operating a hydrofining reactor in conjunction with a high pressure naphtha hydroforming system.

Hydrofining is a well known process for the treatment of a variety of hydrocarbon fractions in order to improve various properties thereof. For example, naphtha fractions are generally subjected to hydrofining to remove sulfur and nitrogen compounds which may interfere with or adversely affect the hydroforming of such naphtha fractions in contact with platinum-alumina catalysts. In the ordinary operation, naphtha either directly from crude fractionation or storage is preheated and supplied to a hydrofining reactor charged with a hydrofining catalyst such as a cobalt molybdate or a mixture of cobalt oxide and molybdenum oxide upon an alumina-containing support maintained at about 500 to 700° F. and about 50 to 500 p.s.i.g. Hydrogen, or preferably hydrogen-rich tail gas from a hydroforming operation is also supplied to the hydrofining reactor in amounts of about 30 to 3000 generally about 200 to 800 s.c.f./barrel of naphtha feed. The naphtha charge rate is about 0.1 to about 20, preferably 2 to 6 volumes per volume of catalyst per hour and the hydrogen consumed in the hydrofining treatment is ordinarily about 1 to 20 s.c.f./bbl. but may be as high as 150–600 s.c.f./bbl.

A serious problem that has been encountered in several locations has been that of increasing pressure drop across such naphtha hydroformer feed hydrofiner reactors. This pressure drop build-up is due to coke, polymer and scale deposition on the top of the catalyst bed. Numerous expedients have been proposed to overcome or to help minimize this problem. In spite of these measures, pressure drop build-up continues to occur and ultimately necessitates a shutdown of the unit in order to dump the catalyst, screen it to remove the scale and catalyst fines and recharge the reactor with screened, coarse catalyst. This is an expensive, tedious operation that generally requires about three days in the case of a commercial hydrofining reactor having a capacity of about 20,000 barrels of naphtha feed per day.

It is the object of this invention to provide an improved method for reducing the pressure drop in fixed bed hydrofining reactors.

It is a further object of this invention to provide a method for effectively reducing the pressure drop in fixed bed hydrofining reactors in a matter of less than about six hours rather than several days.

It is also the object of this invention to provide an improved method for reducing the pressure drop in fixed bed hydrofining reactors of an integrated hydrofiner-platinum catalyst hydroforming unit while the latter is kept on-stream.

These and other objects will appear more clearly from the detailed specification and claims which follow.

It has now been found that where oxygen and scale exclusion do not completely overcome the problem of pressure drop build-up in naphtha feed hydrofining units, bed "fluffing" can be applied to reduce the pressure drop to design levels while the platinum catalyst hydroforming unit remains on stream. Bed "fluffing" is accomplished by temporarily reversing the direction of treat gas flow i.e. by passing treat gas upflow through the hydrofiner bed while the naphtha feed is diverted. The superficial velocity of the upflowing gas should be less than that necessary to fluidize the bed but sufficient to disrupt and dislodge the layer of coke and scale responsible for the pressure drop build-up and to convey the coke and scale particles out of the hydrofining unit and ordinarily will be from 1 to 4 feet per second. Fluffing the bed in this manner permits the reaction mixture to flow through the hydrofining unit at normal, low pressure drop in subsequent operations. This is an effective, economic alternate to shutting down the unit for regenerating, dumping and screening of the hydrofiner catalyst.

It is desirable to provide a low sulfur naphtha, say one containing less than 100 p.p.m. S, for charging to the platinum hydroforming unit while the hydrofining unit is being fluffed. This may be accomplished in various ways, for example by providing a low sulfur virgin naphtha or hydrofined naphtha from tank storage. In some cases if the feed out period for the hydrofiner is kept fairly short, i.e. about 10 minutes, it is possible to raise the level of the hydrofined naphtha in the absorber stripper by reducing the feed rate to the hydroformer and maintain the supply of hydrofined feed at the lower feed rate to the platinum hydroformer during a short fluffing operation. Where feed sulfur runs as high as 300 to 500 p.p.m., precautions should be taken to cut down the time required for fluffing and to reduce the sulfur content of the feed by some means such as blending stored hydrofined or other low sulfur feed. If the feed comprises a blend of virgin and cracked stocks, the cracked stock should be cut of the feed during any period in which the feed is by-passing the hydrofiner.

Fluffing of hydrofiner reactors containing scale traps is also possible. However, in such case, even greater care must be taken to insure against fluidizing the catalyst bed since disruption of the bed would alter the position of the scale traps rendering them ineffective.

Reference is made to the accompanying drawing illustrating a diagrammatic flow plan of an integrated hydrofiner-hydroformer system in which the present invention is applied.

In the drawing, 1 is a naphtha feed inlet line and 2 a pump for delivering the feed at the desired pressure to the reactor system via line 3 and preheat exchangers 4 wherein heat is absorbed by the feed by indirect heat exchange with the hydrofined product and heat exchanger 5 wherein the hydrofiner feed is further heated by indirect heat exchange with the effluent from the platinum hydroformer. Hydrogen-containing treat gas from the sources described below is supplied via line 6, intermixed with preheated naphtha feed and charged via valved inlet line 7 into the top of the hydrofiner reactor 10. The reaction products are withdrawn from the bottom of the hydrofiner reactor 10 through line 11 and after passing through heat exchangers 4 and condenser 12, the products are discharged into hydrofiner separator 13. The gaseous products are taken overhead from the separator via outlet line 14 and either burned or scrubbed to remove $H_2S$, $NH_3$ etc., so that purified excess hydrogen may be recycled. The liquid products are withdrawn via line 15 and pumped via pump 16 through line 17 into absorber stripper 18. The upper portion of the absorber stripper 18 is maintained at a temperature of at least about 100° F. in order to insure the stripping of hydrogen sulfide, ammonia and water from the hydrofined naphtha, the vapors being discharged as tail gas through outlet line 19. Hydrogen-rich make gas from the hydroformer is supplied to the absorber-stripper through inlet line 20 to aid in stripping the above vapors from the hydrofined naphtha. The lower portion of the absorber-stripper 18 is maintained at a temperature below about 140° F. in order to insure the absorption of the $C_3$–$C_5$ hydrocarbon in the make gas by the hydrofined naphtha. The bottom of the absorber-stripper serves as a storage vessel or reservoir for the stripped hydrofined naphtha. The naphtha is withdrawn from the absorber stripper via line 21, pumped up to hydroformer system pressure, preheated to reaction temperature and combined with preheated, hydrogen-rich recycle gas supplied through line 22 and fed into the reformer reaction section 23. It will be understood that reformer reaction section 23 will, as is conventional, comprise a plurality of separate reactor vessels with means for reheating the reaction mixture between vessels and with suitable means for regenerating the catalyst in all of the vessels at one time or in one vessel at a time using a "swing" reactor in place of the reactor undergoing regeneration.

The reformate is withdrawn from reformer section 23 via line 24 and passed in part through line 25 to heat exchangers for preheating feed or recycle gas streams, thence through condenser 27 and line 28 into reformate separator 30. Hydrogen-rich recycle gas is taken overhead through line 31 and recycled via line 32 and compressor 33 to a preheater furnace, not shown, back into the reformer section. Part of the recycle gas, actually the excess or make gas that must be removed from the reformer system, is withdrawn from line 31 via line 20 and introduced as a stripper gas to the absorber stripper 18. Ordinarily, if the sulfur content of the feed naphtha is not too high, the tail gas taken overhead from the absorber stripper can be charged to line 6 and thence to the hydrofiner reactor 10 and the sulfur content of the recycle controlled by bleeding part of the gas to a flare or to fuel and/or by adding hydroformer make or tail gas to line 6 directly from hydroformer recycle gas line 31. If the amount of treat gas available from the hydroformer section is limited, sulfur can be removed from the hydrofiner tail gas by scrubbing and the purified tail gas then recycled to the hydrofiner reactor.

The liquid reformate product is withdrawn from reformate separator 30 via line 34 and transferred through line 35 to product stabilizer or storage equipment. All of the foregoing is essentially conventional for an integrated hydrofiner-platinum catalyst hydroformer system. The following are the essential elements that must be provided in the system to permit fluffing of the hydrofiner catalyst bed to reduce pressure drop therein. In the first place, in order to divert the naphtha feed, a by-pass line 40 is provided to convey the feed naphtha from inlet line 3 to line 17 and thence to the absorber stripper. If the bottom section of the absorber stripper has adequate capacity to supply the hydroformer section during the period that the hydrofiner is off stream, this line can be omitted or flow therethrough can be limited so that the hydrofined naphtha in the absorber stripper will only gradually become diluted with unhydrofined naphtha.

A connection 41 is provided for the supply of inert gas for purging the exchangers 4 and 5. Risers for depressuring the hydrofiner section are provided at 42 upstream of the feed preheat exchangers 4 and at 43 at the top of the hydrofining reactor. In order to permit reversal of direction of flow of the treat gas, a valved line 44 is provided between inlet line 7 and outlet line 11. Finally, in view of the fact that hydrofiner feed is not passing through heat exchanger 5 during the fluffing operation hydroformate is not circulated therethrough via lines 25 and 26. In order to replace the cooling effect of heat exchanger 5, part of the liquid hydroformate is withdrawn from outlet line 34 and passed via line 45, pump 46 and line 47 into the reformate line 24.

The following is a relatively long time fluffing procedure applicable particularly where the sulfur content of the feed naphtha is relatively low, i.e. below 100 p.p.m. and may, therefore, be hydroformed, without previous hydrofining, for the six to eight hours required for "fluffing" the hydrofiner reactor without severely degrading the platinum hydroforming catalyst.

(1) The naphtha holdup in the system (hydrofiner reactor, separator, and preheat exchangers) is reduced by cutting the feed rate to the hydrofiner while holding the absorber-stripper feed rate constant. This lowers the liquid level in the hydrofiner separator. When the level is as low as practical, the bypass 40 around the feed hydrofiner circuit is opened. The unit feed rate is then increased so that the absorber-stripper feed rate is held constant. The feed rate to the platinum reformer section is kept as constant as possible during this switching operation. Insofar as possible, no changes in feed rate or temperature are made during the "fluffing" operation which normally lasts 6-8 hours.

(2) While "fluffing" the temperature of the reformate to the light ends section of the hydroformer section would be appreciably higher than normal since the hot reformate is used to preheat the naphtha feed to the hydrofiner during normal operation. To reduce the temperature of the reformate, a portion of the cool reformate from the separator is recycled via lines 45 and 47. The spare absorber-stripper feed pump is used for this service. The recycle of reformate keeps the temperature in the heat exchangers downstream of the outlet of the last reactor within their design limits.

(3) Hydrofiner treat gas is passed downflow through the hydrofiner reactor to purge naphtha from the catalyst. The gas goes overhead in the hydrofiner separator and is sent to the refinery fuel system.

(4) The hydrofiner and its separator are then depressured through the blowdown system, i.e. depressuring risers 42 and 43.

(5) The hydrofiner preheat exchanges are purged with inert gas using the temporary hose connection 41 upstream of the exchangers. The inert gas purge carries naphtha out of these exchangers. The purge gas and naphtha are passed through the hydrofiner reactor and separator to hold a slight positive pressure in the system. The purge gas is sent to the blowdown system.

(6) The naphtha inlet line at the top of the hydrofiner reactor, and all vent and drain lines in the hydrofiner separator are closed. Steam is put into the "fluffing" vent line at the top of the reactor to provide snuffing protection and to act as a purge.

(7) The hydrofiner circuit is pressured from the bottom of the reactor with treat gas to at least its full working pressure. The depressuring or "fluffing" valve (valve "A" on line 43) is then opened. The system is pressured and "fluffed" at least two times or until the purge gas is visibly clear i.e., relatively free of the sooty material which is carried out into the atmosphere during the first and second depressurings.

(8) The hydrofiner preheat exchangers 4 are also pressured and vented by pressuring the hydrofiner reactor and exchangers with hydrofiner treat gas. The gas passes back through the exchangers to a separate depressuring riser when the exchanger depressuring valve is opened (valve "B" on line 42). This removes loose coke and scale from the exchangers and prevents carryover to the hydrofiner reactor which could deposit additional scale on the top of the bed when the unit is put back onstream.

(9) After "fluffing", the circuit is pressured with hydrofiner treat gas to normal working pressure and the unit put back onstream.

An alternate procedure would be to by-pass the hydrofiner reactor by closing the valves in lines 7 and 11 and opening the valve in line 44 and connecting a source of high pressure treat gas to the bottom of reactor 10, pressuring the reactor to or above normal pressure of 200–300 p.s.i. and opening valve A in depressuring riser line 43. This would permit normal naphtha flow in the rest of the hydrofiner circuit so that it would not be necessary to stop flow and inject hydroformate into line 24.

A further alternate procedure would be to open by-pass line 44 while continuing flow through the hydrofiner.

The valve in outlet line 11 is then closed while at the same time high pressure treat gas is supplied to the bottom of the reactor and passed up through the bed at a velocity sufficient to shake up and dislodge the scale. The gas, upon leaving the reactor, mixes with the naphtha and a treat gas passing through the by-pass and goes overhead in the hydrofiner separator. Some scale particles are probably carried out of the reactor and over to the hydrofiner separator. The bulk of the scale, however, is not removed but is broken up sufficiently to allow free passage of the process stream in subsequent operation.

The foregoing description contains a limited number of embodiments of the present invention. It will be understood that numerous variations are possible without departing from the scope of the following claims.

What is claimed is:

1. In the operation of a hydrofiner reactor in which a mixture of naphtha and hydrogen-containing treat gas is passed downwardly through a fixed bed of hydrofining catalyst particles and in which operation there is a gradual accumulation of scale and other fine particles at the top of the bed thereby causing a substantial increase in the pressure drop through the reactor, the improvement which comprises passing treat gas upwardly through the catalyst bed at a velocity of about 1 to about 4 feet per second sufficient to dislodge and disrupt the layer of scale but insufficient to fluidize or agitate the fixed bed of catalyst particles, entraining the scale particles in the treat gas and carrying the scale particles overhead from said reactor in the treat gas.

2. In the operation of an integrated naphtha feed hydrofiner and a platinum catalyst hydroformer system in which a mixture of naphtha and hydrogen-containing treat gas is passed downwardly through a fixed bed of hydrofining catalyst particles and in which operation there is a gradual accumulation of scale and other fine particles at the top of the bed thereby causing a substantial increase in the pressure drop through the reactor, the improvement which comprises diverting the naphtha feed from the hydrofiner reactor, maintaining the feed of a low sulfur containing naphtha to the platinum catalyst hydroformer and passing treat gas upwardly through the hydrofiner catalyst bed at a velocity of about 1 to about 4 feet per second sufficient to disrupt and dislodge the layer of scale but insufficient to fluidize or agitate the fixed bed of catalyst particles, entraining the scale particles overhead from the hydrofiner reactor in the treat gas and resuming the flow of naphtha vapors and treat gas downwardly through the hydrofiner at substantially lower pressure drop.

3. In the operation of a hydrofiner reactor in which a mixture of naphtha and hydrogen-containing treat gas is passed downwardly through a fixed bed of hydrofining catalyst particles and in which operation there is a gradual accumulation of scale and other fine particles at the top of the bed thereby causing a substantial increase in the pressure drop through the reactor, the improvement which comprises passing treat gas upwardly through the catalyst bed at a velocity of about 1 to about 4 feet per second sufficient to dislodge and disrupt the layer of scale but insufficient to fluidize or agitate the fixed bed of catalyst particles, entraining the scale particles in the treat gas, carrying the entrained scale particles overhead from the reactor in the treat gas, then passing the treat gas and entrained scale particles through feed heat exchangers to cleanse the heat exchanger surfaces and finally to the atmosphere.

References Cited in the file of this patent

UNITED STATES PATENTS

| | | |
|---|---|---|
| 2,268,187 | Churchill | Dec. 30, 1941 |
| 2,319,620 | Mather | May 18, 1943 |
| 2,475,822 | Cummings | July 12, 1949 |
| 2,722,501 | Kassel | Nov. 1, 1955 |